(12) United States Patent
Chen

(10) Patent No.: US 7,990,806 B2
(45) Date of Patent: Aug. 2, 2011

(54) SEISMOGRAPH SYSTEM

(75) Inventor: Ga-Lane Chen, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 178 days.

(21) Appl. No.: 12/488,550

(22) Filed: Jun. 20, 2009

(65) Prior Publication Data

US 2010/0103777 A1 Apr. 29, 2010

(30) Foreign Application Priority Data

Oct. 23, 2008 (CN) .......................... 2008 1 0305112

(51) Int. Cl.
*G01V 1/18* (2006.01)
(52) U.S. Cl. ........................................................ 367/178
(58) Field of Classification Search .................... 367/77, 367/178
See application file for complete search history.

(56) References Cited

U.S. PATENT DOCUMENTS

| | | | |
|---|---|---|---|
| 5,894,090 A * | 4/1999 | Tang et al. ................. | 73/504.02 |
| 2007/0070808 A1* | 3/2007 | Ray et al. ......................... | 367/15 |
| 2008/0080311 A1* | 4/2008 | Eperjesi et al. ................. | 367/77 |

OTHER PUBLICATIONS

Varadan et al., "Wireless MEMS-IDT based accelerometer and gyroscope in a single chip", Smart Materials Bulletin, vol. 2000, Issue 12, Dec. 2000, pp. 9-13.*

* cited by examiner

*Primary Examiner* — Ian J Lobo
(74) *Attorney, Agent, or Firm* — Raymond J. Chew

(57) ABSTRACT

A seismograph system includes a seismometer, a positioning unit, a transmitter, a remote processing device. The seismometer includes a micro electromechanical system (MEMS) accelerometer and a MEMS gyroscope. The seismometer, the positioning unit, and the transmitter being located at a detecting site. The MEMS accelerometer and the MEMS gyroscope are respectively configured for measuring an acceleration and an angular velocity of the movement of the earth at the detecting site. The positioning unit is configured for providing a location at the detecting site. The transmitter is configured for transmitting the measured acceleration, the measured angular velocity, and the provided location to the remote processing device. The remote processing device is positioned at a remote site and configured for analyzing recording the measured acceleration, the measured angular velocity, and the provided location.

7 Claims, 3 Drawing Sheets

SEISMOGRAPH SYSTEM

BACKGROUND

1. Technical Field

The present disclosure relates to a seismograph system.

2. Description of Related Art

Seismograph systems are used to locate source and measure size of earthquakes. Modern seismograph systems are typically electromagnetic type. These electromagnetic seismograph systems are typically bulky and high-cost.

Therefore, it is desirable to provide a seismograph system, which can overcome the above-mentioned problems.

DETAILED DESCRIPTION

Figure 1:
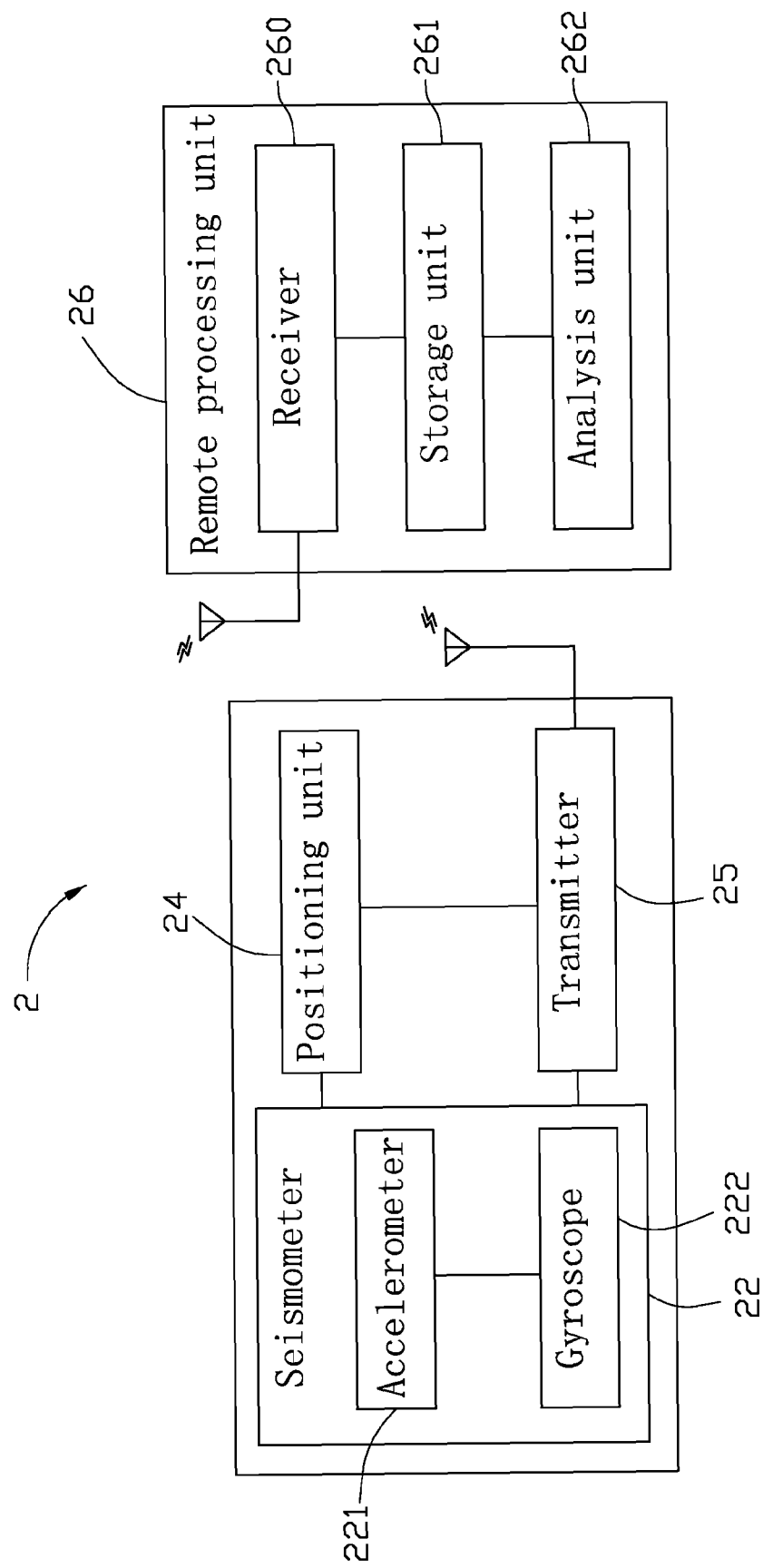
FIG. 1 is a functional block diagram of a seismograph system, according to an exemplary embodiment.

Referring to FIG. 1, a seismograph system 2, according to an exemplary embodiment, includes a seismometer 22, a positioning unit 24, a transmitter 25, and a remote processing device 26. The seismometer 22, the positioning unit 24, and the transmitter 25 are positioned at a detecting site. The remote processing device 26 is positioned at a remote site.

The seismometer 22 includes a micro electromechanical system (MEMS) accelerometer 221 and a MEMS gyroscope 222. The MEMS accelerometer 221 is configured for measuring an acceleration of the movement of the earth at the detecting site. The MEMS gyroscope 222 is configured for measuring an angular velocity of the movement of the earth at the detecting site.

Figure 2:
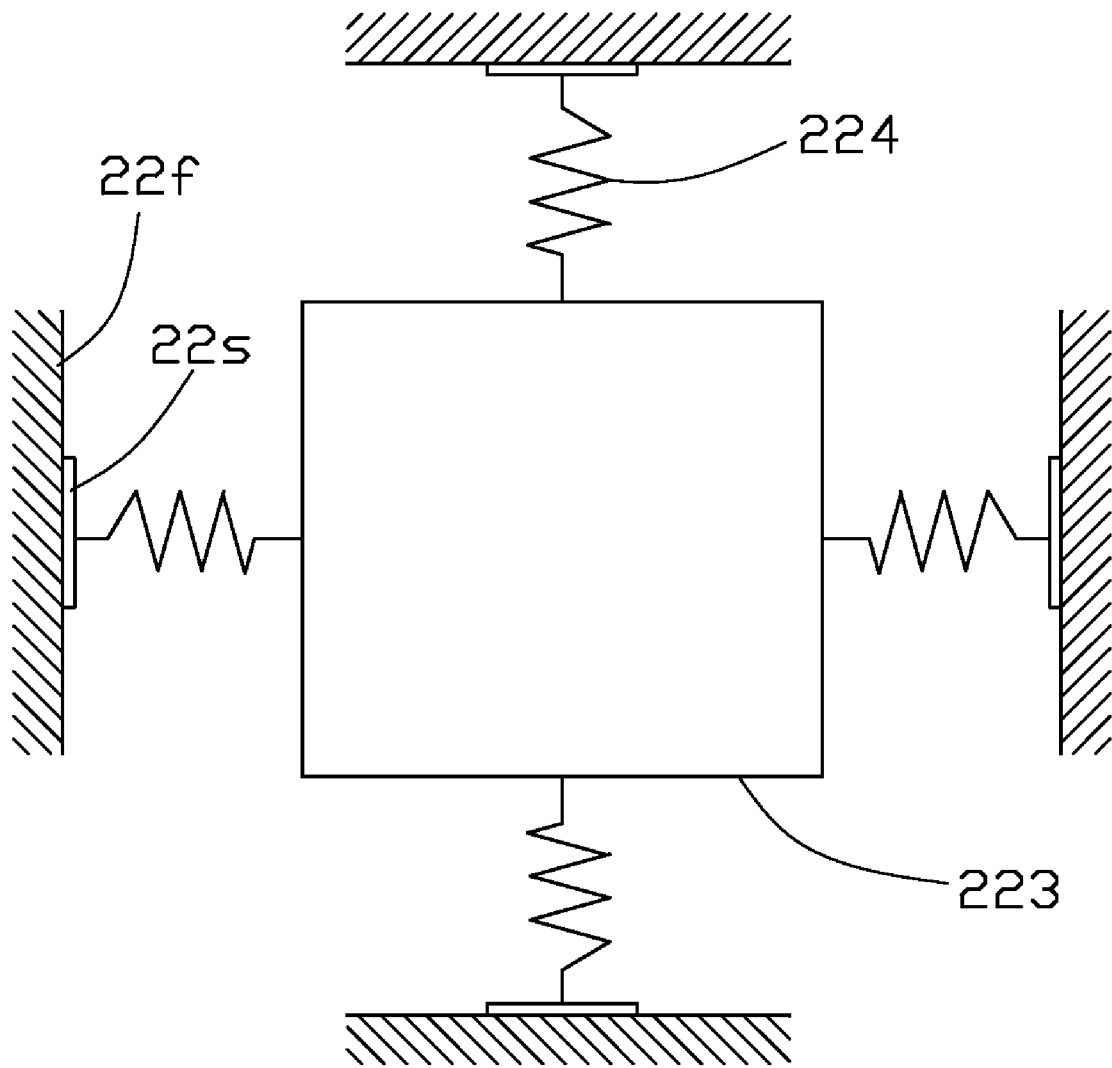
FIG. 2 is a schematic view showing a visualized model of a seismometer of the seismograph system of FIG. 1.

Referring to FIG. 2, to provide a better understanding of the working principle of the seismometer 22, the seismometer 22 can be understood by visualizing a weight-spring model (not labeled). The weight-spring model includes a frame (not labeled), a weight 223, four springs 224, and four sensor 22s. The frame is placed on the ground at the detecting site and capable of moving along with the ground at the detecting site. Typically, the frame includes four sidewalls 22f. The weight 224 is suspended from the four sidewalls 22f using the four springs 226. The sensor 22s is configured for sensing elastic forces of the corresponding springs 224, and can be a capacitive sensor, (force-to-capacitance) or a piezoelectric type (force-to-resistance).

When the weight-spring model is used to measure the acceleration, normally, the weight 223 is stationary. When the earth at the detecting site moves, relative motion between the weight 223 and the frame and corresponding deformation of the springs 224 are induced. Then, the acceleration of the movement of the earth at the detecting site can be calculated using the following formula: F=ma, where F represents the sensed elastic force of the springs 224 and m represents the quality of the weight 223.

When the weight-spring model is used to measure the angular velocity, the weight 223 is driven by the springs 224 to move back and forth freely at normal state. The velocity of the weight 223 $\bar{v}$ can be determined by the characteristics of the weight-spring model. When the earth at the detecting site moves, the angular velocity of the movement of the earth at the detecting site $\bar{w}$ can be calculated by the formula: $\overline{Fc} = 2m\bar{w} \times \bar{v}$, where $\overline{Fc}$ is Coriolis force and can be determined by the elastic force of the springs 224.

Figure 3:
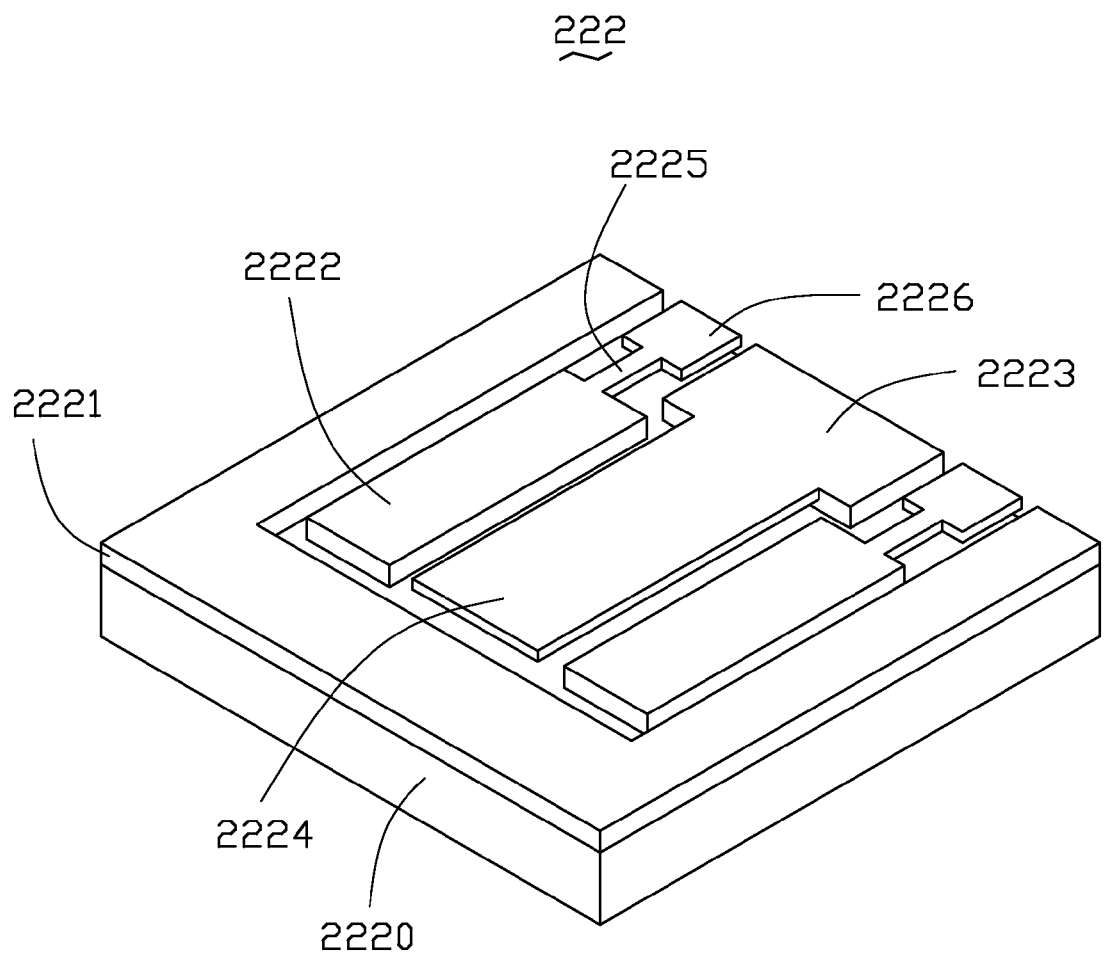
FIG. 3 is an isometric schematic view of a gyroscope of the seismograph system of FIG. 1.

Referring to FIG. 3, in this embodiment, the MEMS gyroscope 222 includes a substrate 2220 and a silicon film 2221 formed on the substrate 2220 using a sputtering method.

The substrate 2220 can be made from glass, ceramic or sapphire. The silicon film 2221 is patterned using reactive ions etching (RIE) method such that the silicon film 2221 includes a main base portion 2223, a main cantilever portion 2224, a pair of secondary base portions 2222, a pair of secondary cantilever portions 2225, and a pair of weight potions 2226. The main base portion 2223 is rectangular and connected to the substrate 2220. The main cantilever portion 2224 is rectangular and extends away from the middle of a long edge of the main base portion 2223 along a direction parallel to the width of the main base portion 2223. The two secondary base portions 2222, secondary cantilever portions 2225, and weight portions 2226 are symmetric about an axis (not shown) passing through the centers of the main base portion 2223 and the main cantilever portion 2224. The secondary base portions 2222 are rectangular and connected to the substrate 2220. The lengths of the secondary base portions 2222 are generally parallel to that of the main cantilever portion 2224. The secondary cantilever portions 2225 are strips extending from ends of the corresponding secondary base portions 2222 adjacent to the main base portion 2223 along the length of the secondary base portions 2222. The two weight portions 2226 are correspondingly suspended from the secondary base portions 2222 via the secondary cantilever portions 2225.

The two secondary cantilever portions 2225 are made from piezoelectric material. Therefore, when any force is applied to the weight portions 2226, the secondary cantilever portions 2225 suffer stress and deform. Correspondingly, the resistance of the second cantilever portions 2225 changes. These changes can be measured using Wheatstone bridge. Therefore, the angular velocity $\bar{w}$ can be determined.

The positioning unit 24 can be a global positioning system (GPS) receiver and is configured for obtaining the location at the detecting site.

The transmitter 25 can be a radio based transmitter and can work at frequencies from 2 GHz to 11 GHz. In three exemplary embodiments, the transmitter 25 works at 3 GHz, 3.5 GHz, and 4 GHz.

The remote processing device 26 includes a receiver 260, a storage unit 261, and an analysis unit 262. The receiver 260 is configured for receiving the measured acceleration, the measured angular velocity, and the location at the detecting site from the transmitter 25. The storage unit 261 is configured for recording the measured acceleration, the measured angular velocity, and the location at the detecting site. The analysis unit 262 is configured for analyzing the measured acceleration, the measured angular velocity, and the location at the detecting site to map the interior of the earth or for the purpose of predicting of earthquake.

The seismograph system 2 uses the MEMS accelerometer 221 and MEMS gyroscope 222 to measure the acceleration and angular velocity. Size and cost can be significantly reduced, as compared with electromagnetic type seismograph system.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A seismograph system comprising:
a seismometer comprising a micro electro-mechanical system accelerometer and a micro electro-mechanical system gyroscope;
a positioning unit;
a transmitter; and
a remote processing device,
the seismometer, the positioning unit, and the transmitter being located at a detecting site, the micro electro-mechanical system accelerometer being configured for measuring an acceleration of the movement of the earth at the detecting site, the micro electro-mechanical system gyroscope being configured for measuring an angular velocity of the movement of the earth at the detecting site, the positioning unit being configured for providing a location at the detecting site, the transmitter being configured for transmitting information associated with the measured acceleration, the measured angular velocity, and the provided location to the remote processing device,
the remote processing device being positioned at a remote site and configured for analyzing the measured acceleration, the measured angular velocity, and the provided location;
wherein the micro electro-mechanical system gyroscope comprises a substrate and a silicon film formed on the substrate, the silicon film comprises a main base portion, a main cantilever portion, a pair of secondary base portions, a pair of secondary cantilever portions, and a pair of weight portions, the main base portion is rectangular and connected to the substrate, the main cantilever portion is rectangular and extends away from the middle of a long edge of the main base portion along a direction parallel to the width of the main base portion, the two secondary base portions, secondary cantilever portions, and weight portions are symmetric about an axis passing through the centers of the main base portion and the main cantilever portion, the secondary base portions are rectangular and connected to the substrate, the lengths of the secondary base portions are generally parallel to that of the main cantilever portion, the secondary cantilever portions are strips extending from ends of the corresponding secondary base portions adjacent to the main base portion along the length of the secondary base portions, and the two weight portions are suspended from the secondary base portions via the secondary cantilever portions.

2. The seismograph system as claimed in claim 1, wherein the substrate is made from a material selected from the group consisting of glass, ceramic and sapphire.

3. The seismograph system as claimed in claim 1, wherein the positioning unit comprises a global positioning system receiver.

4. The seismograph system as claimed in claim 1, wherein the transmitter comprises a radio based transmitter.

5. The seismograph system as claimed in claim 4, wherein the working range of the transmitter is from about 2 GHz to about 11 GHz.

6. The seismograph system as claimed in claim 1, wherein the remote processing device comprises a receiver, a storage unit, and an analysis unit, the receiver being configured for receiving the information associated with the measured acceleration, the measured angular velocity, and the location at the detecting site from the transmitter, the storage unit being configured for recording the measured acceleration, the measured angular velocity, and the location at the detecting site, the analysis unit being configured for analyzing the measured acceleration, the measured angular velocity, and the location at the detecting site.

7. The seismograph system as claimed in claim 1, wherein the two secondary cantilever portions are made from piezoelectric material.

* * * * *